Figure 1:
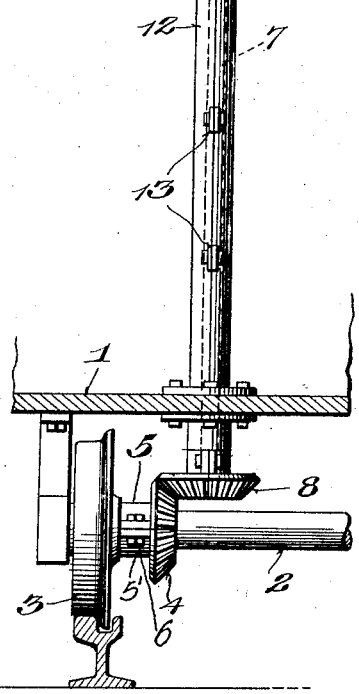

C. TALOTTA.
CHANGEABLE INDICATOR.
APPLICATION FILED JUNE 23, 1920.

1,394,234.

Patented Oct. 18, 1921.
2 SHEETS—SHEET 1.

WITNESS:—
Chas. R. Grieshaver

Inventor
C. Talotta,
By Bacon & Thomas
Attorneys

C. TALOTTA.
CHANGEABLE INDICATOR.
APPLICATION FILED JUNE 23, 1920.
1,394,234.
Patented Oct. 18, 1921.
2 SHEETS—SHEET 2.
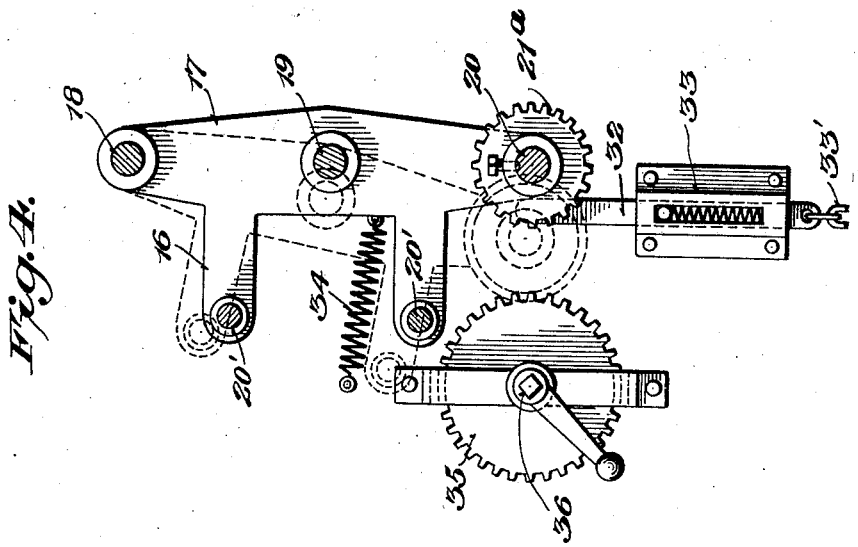
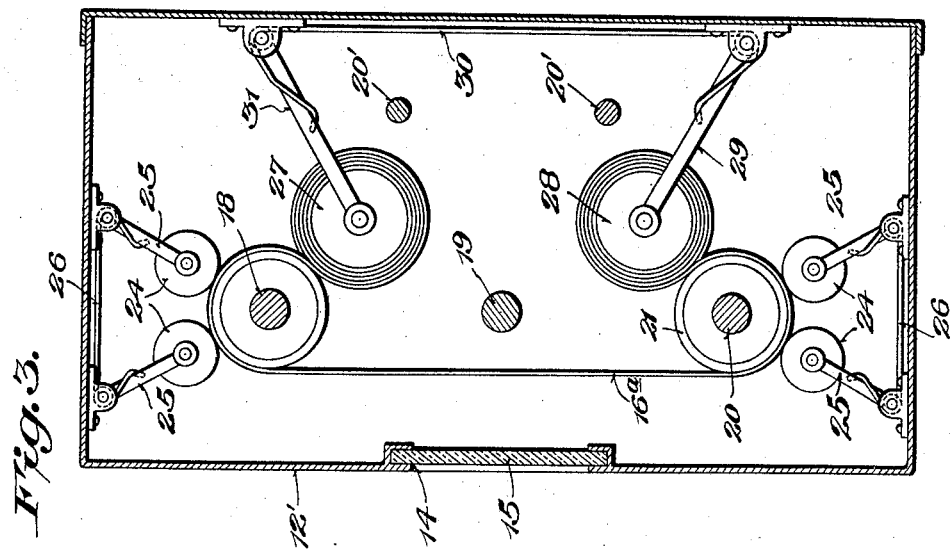
Inventor
C. Talotta,
WITNESS:—

UNITED STATES PATENT OFFICE.

CARMINE TALOTTA, OF CLEMENTON, PENNSYLVANIA.

CHANGEABLE INDICATOR.

1,394,234. Specification of Letters Patent. Patented Oct. 18, 1921.

Application filed June 23, 1920. Serial No. 391,141.

*To all whom it may concern:*

Be it known that I, CARMINE TALOTTA, a subject of the King of Italy, residing at Clementon, in the county of Lehigh and State of Pennsylvania, have invented certain new and useful Improvements in Changeable Indicators, of which the following is a specification.

The invention relates to improvements in an automatic indicator primarily intended for application to street railways, although of course capable of being used in other fields, such for instance as steam railways, motor buses, and the like.

It is an object of the invention to provide a changeable indicator adapted to be applied to street vehicles, and the like, and serving to always inform the occupants of the vehicle as to the location thereof. The invention has in mind the provision of a changeable indicator primarily intended for use on street railways, including a movable element having thereon in successive order the names of the various stops along the route of the car, which movable indicator is actuated by a driving connection with the axle of the car to present the names of the car stops successively so as to inform the occupants of the car when a particular stop which is to be a destination is reached, eliminating the necessity of depending upon the memory of a conductor or employee to announce the various streets along the route which manifestly they often fail to do.

With the foregoing conception in mind, the invention contemplates indicating means for street railways embodying a shiftable or movable tape having arranged thereon the names of the streets in successive order, at which the car is to stop, and gearing means interposed between the axle of the car and the indicator for moving the indicator a given distance to agree with the distance between a pair of stopping points along the railway route to always present to the occupants the name of a given street prior to the time the car reaches the same. The tape is wound around suitable rollers disposed within a shiftable frame, which frame receives suitable shafts having driving gears thereon whereby when the same is in an operative position, the tape will be moved in consonance with the movement of the car while if it is desired to place the indicator out of operation for a rewinding or other purposes, this may be accomplished by shifting the frame so that the driving gear is moved out of mesh with the gear on the drive shaft.

The invention further contemplates a novel construction of indicator, that is exceedingly simple in operation, embodies few parts and is inexpensive to manufacture.

Figure 2:
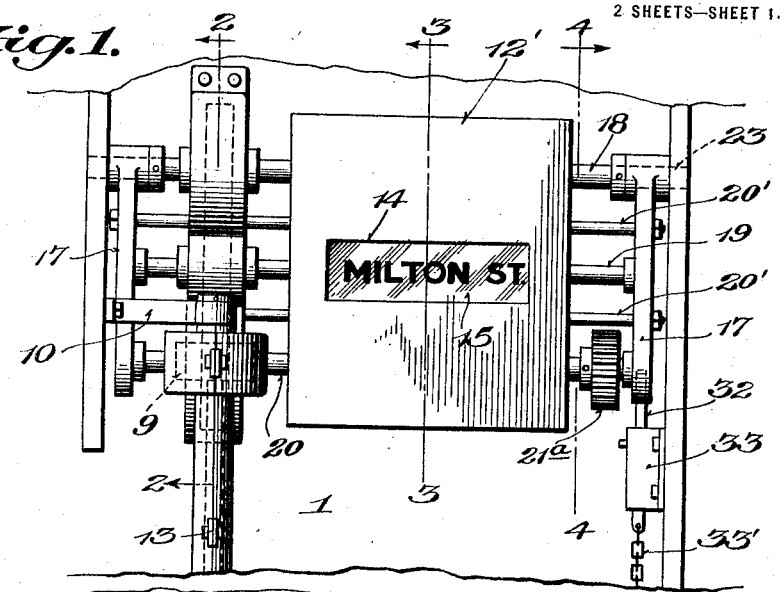
Figure 2:
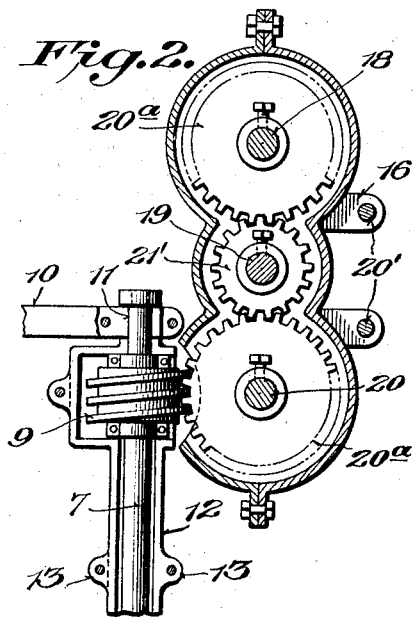

In the accompanying drawings, I have disclosed a single embodiment of the invention, in which Figure 1 is a front elevation of the device. Fig. 2 is a sectional view; and Figs. 3 and 4 are sections through different portions of the device.

Referring now more particularly to the drawings, wherein like reference characters indicate corresponding parts, the numeral 1 designates a railway car, which may be the usual street car or the like. The same is provided with supporting axles 2 and flanged car wheels 3. Secured upon the axle 2 is a gear 4, composed of a pair of gear segments 5 and 5' bolted together by the fastening bolts 6 for rigidly securing the gear upon the axle. To prevent a relative movement of the gear and the axle a splined key may be employed, or other equivalent fastening devices so long as an independent rotation of the gear and the axle is not permitted.

Extending at right angles to the axle 2 and projecting to a point near the top of the car 1, is a main driving shaft 7, having at its lower end a beveled gear 8 meshing with the main gear 4 secured to the vehicle axle. The upstanding shaft near its upper end has secured thereto a worm driving gear 9 which is preferably composed of a pair of sections united by suitable collars and fastening bolts to the main drive shaft. This gear is adapted to mesh with a driving gear of the changeable indicator in a manner which will be later described. The upstanding shaft 7 at its free end is supported by a bracket 10 secured to the wall of the car and preferably composed of metal having an opening 11 receiving the end of the shaft 7. The entire shaft and its gear 9 are likewise preferably incased by a metallic protecting covering 12 composed of separable sections having suitable ears 13 adapted to receive securing bolts for fastening the sections of the casing together.

Disposed adjacent the upper end of the main driving shaft 7 is a suitable relatively narrow changeable indicating casing 12', preferably composed of sheet metal and having a transverse vision plate or opening 14 therein receiving a glass panel 15 through which a suitable tape or band 16ª is visible. The housing, as before stated, is preferably composed of metal and is disposed transversely of the car between the sides thereof. Disposed on each side of the housing are suitable frames 16 each consisting of side members 17 having a plurality of openings therein to receive the shafts 18, 19 and 20. There is also disclosed a pair of connecting rods 20′ entering suitable apertures in the frame 16 which connecting rods also pass through the side walls of the housing or casing 12′. The shafts 18, 19, and 20 are journaled in the frame 16 for a rotary movement, the shaft 18 being slightly longer than the shafts 19 and 20, and seated within suitable sockets 23 in the side walls of the railway car constituting a support for the side frames and the casing. The shafts 18 and 20 are likewise provided within the casing with suitable elastic coverings 21 of rubber or the like around which the indicating tape to be later described, winds. The casing and the frame members 16 are mounted for a swinging movement by reason of the supporting shaft 18 so as to permit the entire casing to be moved on its pivot from a vertical to an inclined position for a reason which will hereinafter appear. The shafts 18 and 20 have attached thereto suitable gears 20ª meshing with a gear 21′ on the shaft 19, the lower gear 20ª meshing with the worm gear on the shaft 7 for imparting a rotary movement to the shafts 18, 19 and 20 for the actuation of the tape passing thereover.

Disposed within the casing 12′ and adapted to pass around the shafts therein is a tape 16ª, the same winding around the shafts 18 and 20, and to insure contact of this tape with the rollers a plurality of spring actuated pressing devices or cylinders 24 are provided, the same being suspended upon movable arms 25 pivoted to the casing 12′ and normally urged toward the rollers by means of springs 26 coöperating with the arms. The housing is also provided with winding rollers 27 and 28 interposed between the rollers 18 and 20 and forced into contact therewith by means of the flat springs 30 acting upon the supporting arms 29 of these rollers. As the driven shafts 18 and 20 are moved, it is apparent that the tape 16ª will be transferred from one roller to the other, being held in contact with the rollers 18 and 20 by means of the pressing rollers 24 while the tape will likewise be unwound from one roller 27 and be wound upon the other roller 28. The rollers 27 and 28 as the tape is wound or unwound thereon, are always held in contact with the driven rollers 18 and 20 by reason of the flat spring coöperating with the supporting arms thereof. It will be apparent that when the car is moving and the worm gear on the shaft 7 is meshing with the lower gear 20ª this will impart a movement to the shafts 18, 19 and 20, and the tape will be progressively moved past the sight opening 14, so that the occupants of the car will always be informed as to the location of the car. It is apparent that the distance between certain stops along the route is greater than the distance between other stops, and to compensate for this the names of the streets are so arranged on the tape that the proper name will always appear at or about the time a given stop is reached. The names of the streets are preferably printed on the tape and are spaced different distances apart in accordance with the distance between a pair of street stops. When the shaft 7 and its worm 8 is rotated, this rotary movement will be imparted to the shafts 18, 19 and 20. The frame members 16 of these shafts and the casing 12′ are maintained in a vertical position, whereby the worm contacts with the gear 20ª by means of a trip lever 32 supported in a bracket 33 to the side wall of the car. This trip when raised engages one of the frame members 16 and retains the same in a vertical position against the tension of the spring 34. However, when the latch is released by means of the chain 33 the entire frame and the casing swing backwardly to a position wherein the lower gear 20ª is thrown into mesh with a gear 35. This gear is mounted upon a suitable shaft 35 and may be actuated by hand or by an electric motor or the like for the purpose of rewinding the tape after the car has reached its destination and is about to make a return trip. The rotation of the gear 35 upon the actuation of the shaft 36 causes the tape to be rewound, and this rewinding can be expeditiously done by hand, or an auxiliary source of power. In using the indicator I preferably dispose one indicator at the front and another at the rear of the car, it being manifest that in this type of construction when the car is moved in one direction the occupants will always look at the indicator in the front portion of the car, while the indicator in the rear thereof which is rewinding receives little or no attention, and which eliminates the necessity of a manual rewinding when the car has reached its destination. When the end of the route has just been reached, and the direction of the movement of the car reversed, then the indicator which has previously been located in the rear of the car will now occupy a forward position, and a rewinding of the indicator will occur so that the indicator will designate the various stops along the route while the other indicator is in the process of rewinding.

Having thus described the invention, what I claim is:—

1. An indicator for railway cars comprising separated swinging frame members, said frame members receiving a plurality of shafts, one shaft passing entirely through openings in the frame members and adapted to enter sockets in the car to support said frame members for a swinging movement, gears carried by the shafts, a driven shaft actuated by the movement of the car having a gear coöperating with a gear on one of said shafts, a casing suspended upon said shafts intermediate their ends, and a movable indicator actuated by the shafts and disposed within said casing, said indicator passing around the shafts, pressing rollers for maintaining the indicator in contact with the shafts, and winding rollers for feeding and receiving the indicator during its movement.

2. An indicator for railway cars comprising separated swinging frame members, said frame members receiving a plurality of shafts, one shaft passing entirely through openings in the frame members and adapted to enter sockets in the car to support said frame members for a swinging movement, gears carried by the shafts, a driven shaft actuated by the movement of the car having a gear coöperating with a gear on one of said shafts, a casing suspended upon said shafts intermediate their ends, and a movable indicator actuated by the shafts and disposed within said casing, said indicator passing around the shafts, pressing rollers for maintaining the indicator in contact with the shafts, and winding rollers for feeding and receiving the indicator during its movement, and means for maintaining the indicator in an operative position comprising a latch.

3. An indicator for railway cars comprising separated swinging frame members, said frame members receiving a plurality of shafts, one shaft passing entirely through openings in the frame members and adapted to enter sockets in the car to support said frame members for a swinging movement, gears carried by the shafts, a driven shaft actuated by the movement of the car having a gear coöperating with a gear on one of said shafts, a casing suspended upon said shafts intermediate their ends, and a movable indicator actuated by the shafts and disposed within said casing, said indicator passing around the shafts, pressing rollers for maintaining the indicator in contact with the shafts, and winding rollers for feeding and receiving the indicator during its movement, and means for maintaining the indicator in an operative position comprising a latch, and resilient means for moving said indicator into a position wherein a gear on one of the shafts coöperates with a reversing gear for rewinding the indicator, substantially as described.

4. An indicator of the character described comprising separated swinging frame members, a plurality of shafts connected with said frame members, one of said shafts constituting a support therefor, meshing gears on said shafts, and driven means for operating one of said gears, a tape operated by the movement of the shafts, means for holding the frame in an operative position for driving the tape, and means for releasing said frame to permit the same to occupy an inoperative position upon a swinging movement thereof to discontinue the movement of the tape.

5. An indicator of the character described comprising swinging frame members, a shaft passing through said frame members and constituting a pivot support therefor; other shafts journaled in said frame members to swing therewith, meshing gears on said shafts, a driven shaft having a gear thereon meshing with one of the gears on one of said shafts, a tape having a plurality of reference characters arranged in successive order adapted to be moved by the operation of the shafts, means for holding the frame in a position for operating the tape.

6. An indicator of the character described comprising swinging frame members, a shaft passing through said frame members and constituting a pivot support therefor; other shafts journaled in said frame members to swing therewith, meshing gears on said shafts, a driven shaft having a gear thereon meshing with one of the gears on one of said shafts, a tape having a plurality of reference characters arranged in successive order adapted to be moved by the operation of the shafts, means for holding the frame in a position for operating the tape, said means comprising a latch, and automatic means for throwing the frame to an inoperative position upon the release of the latch.

7. An indicator of the character described comprising swinging frame members, a shaft passing through said frame members and constituting a pivot support therefor, other shafts journaled in said frame members to swing therewith, meshing gears on said shafts, a driven shaft having a gear thereon meshing with one of the gears on one of said shafts, a tape having a plurality of reference characters arranged in successive order adapted to be moved by the operation of the shafts, means for holding the frame in a position for operating the tape, said means comprising a latch, and automatic means for throwing the frame to an inoperative position upon the release of the latch, in combination with a reversing gear adapted to coöperate with a gear on one of said shafts when the frame is thrown to an inoperative position for rewinding the tape.

In testimony whereof I affix my signature.

CARMINE TALOTTA.